No. 844,422. PATENTED FEB. 19, 1907.
A. L. STROUT.
NUT LOCK.
APPLICATION FILED OCT. 20, 1906.
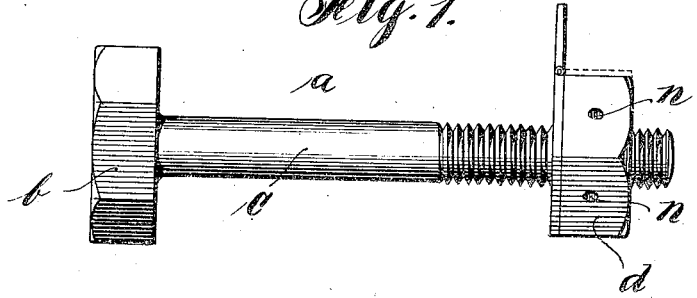
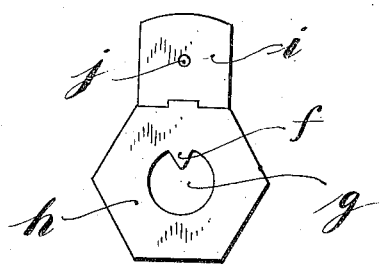
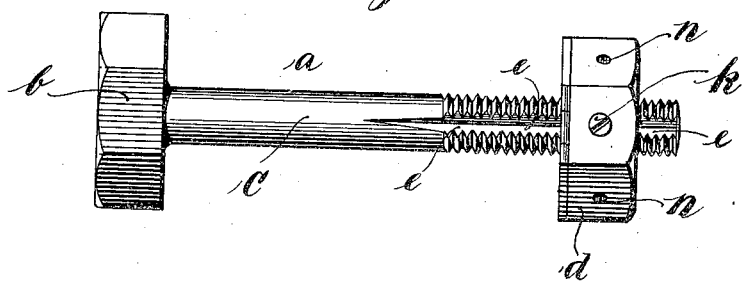

UNITED STATES PATENT OFFICE.

ARTHUR L. STROUT, OF BAR HARBOR, MAINE.

NUT-LOCK.

No. 844,422.　　Specification of Letters Patent.　　Patented Feb. 19, 1907.

Application filed October 20, 1906. Serial No. 339,886.

*To all whom it may concern:*

Be it known that I, ARTHUR L. STROUT, a citizen of the United States, residing at Bar Harbor, in the county of Hancock and State of Maine, have invented a certain new and useful Improvement in Nut-Locks, of which the following is a specification, reference being had to the accompanying drawings.

My invention relates to improvements in nut-locks; and the object of my invention is to provide a nut-lock which is particularly adapted to use with nuts of large size.

Nut-locks in which an integral lip or flap is bent from the edge of a washer to engage a side face of the nut are found not to work well when applied to nuts of large diameter, for the reason that the flap portion is difficult to bend and the bending weakens the washer at its junction with the flap portion. In carrying out my invention I provide the washer with a flap hinged thereto and provide the flap and the faces of the nuts with complementary locking elements.

In the drawings illustrating the principle of my invention and the best mode now known to me of applying that principle, Figure 1 is an elevation showing one form of embodiment of my invention. Fig. 2 is a similar view, the flap being shown in plan view; and Fig. 3 is an elevation showing the washer.

The bolt *a* is provided with the usual head *b* and shank *c*, the latter being threaded, as shown in the drawings, and being thereby adapted to engage the nut *d*. The threaded portion of the shank is formed with a groove *e*, adapted to receive the tooth or prong *f*, which projects inwardly from the wall of the central aperture *g* in the washer *h*. At one of the edges of the washer there is hinged thereto a flap *i* through a hole *j*, in which there is passed a screw *k*, which engages in one of the holes *n*, formed in the side faces of the nut.

It will be seen that the above construction obviates the bending (and thereby what is called the "fatigue") of the metal of the washer. Moreover, a much closer fit is made possible between the flap of the washer and the face of the nut. This construction also serves, in connection with the means for locking the flap to the nut, to increase the security of the nut-lock.

I claim—

In a nut-lock, the combination of a bolt formed with a head at one end and with a threaded portion at its other end, said threaded portion being formed with a longitudinal groove; a polygonal-shaped nut the side faces of which are each formed with a threaded hole; a polygonal-shaped washer of the same size and having the same number of sides as said nut, said washer being interposed between said nut and head and being formed with a tooth which projects into said groove; a flap hinged to one of the sides of said washer and adapted to lie flat upon one of the side faces of said nut, said flap being formed with a hole; and a screw which passes through the hole in said flap and engages in one of the holes in the side faces of said nut.

In testimony whereof I hereunto set my hand, this 12th day of October, A. D. 1906, in the presence of two witnesses at said Bar Harbor.

ARTHUR L. STROUT.

Witnesses:
W. H. PARKER,
LENA C. BENSON.